(12) United States Patent
Ebe

(10) Patent No.: US 10,935,705 B2
(45) Date of Patent: Mar. 2, 2021

(54) OBSERVATION OPTICAL SYSTEM AND OBSERVATION APPARATUS INCLUDING THE SAME

(71) Applicant: CANON KABUSHIKI KAISHA, Tokyo (JP)

(72) Inventor: Hiroki Ebe, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 335 days.

(21) Appl. No.: 15/896,602

(22) Filed: Feb. 14, 2018

(65) Prior Publication Data
US 2018/0231699 A1 Aug. 16, 2018

(30) Foreign Application Priority Data
Feb. 14, 2017 (JP) .............................. JP2017-024739

(51) Int. Cl.
| | | |
|---|---|---|
| *G02B 27/01* | (2006.01) | |
| *G02B 3/08* | (2006.01) | |
| *G02B 25/00* | (2006.01) | |
| *G02B 5/18* | (2006.01) | |
| *G02F 1/1335* | (2006.01) | |

(52) U.S. Cl.
CPC .............. *G02B 5/188* (2013.01); *G02B 3/08* (2013.01); *G02B 25/001* (2013.01); *G02B 27/0101* (2013.01); *G02B 27/0172* (2013.01); *G02B 2027/014* (2013.01); *G02F 1/133526* (2013.01)

(58) Field of Classification Search
CPC ... G02B 2027/0105–0198; G02B 27/01–0189; G02B 3/00–14; G02B 5/00–32; G03B 21/00–64; H04N 9/31–3197
See application file for complete search history.

(56) References Cited

U.S. PATENT DOCUMENTS

| | | | |
|---|---|---|---|
| 2008/0123048 A1* | 5/2008 | Volk ...................... | G02C 7/061 351/159.42 |
| 2016/0363758 A1 | 12/2016 | Ebe | |
| 2017/0248769 A1* | 8/2017 | Stamenov ............ | G02B 25/001 |
| 2017/0371162 A1* | 12/2017 | Makino .............. | G02B 27/0172 |
| 2018/0143400 A1* | 5/2018 | Bone ................... | G02B 25/004 |
| 2018/0275392 A1* | 9/2018 | Song .................. | G02B 27/0172 |

FOREIGN PATENT DOCUMENTS

JP H07-244246 A 9/1995

* cited by examiner

*Primary Examiner* — Christina A Riddle
*Assistant Examiner* — Christopher A Lamb, II
(74) *Attorney, Agent, or Firm* — Carter, DeLuca & Farrell LLP

(57) ABSTRACT

Provided is an observation optical system used for observing an image displayed on an image display surface. The observation optical system includes, in order from an observation surface side to the image display surface side, a first lens having a positive refractive power, and a second lens having a positive refractive power. The first lens is a Fresnel lens, and a focal length f1 of the first lens and a focal length f2 of the second lens are each appropriately set.

14 Claims, 12 Drawing Sheets

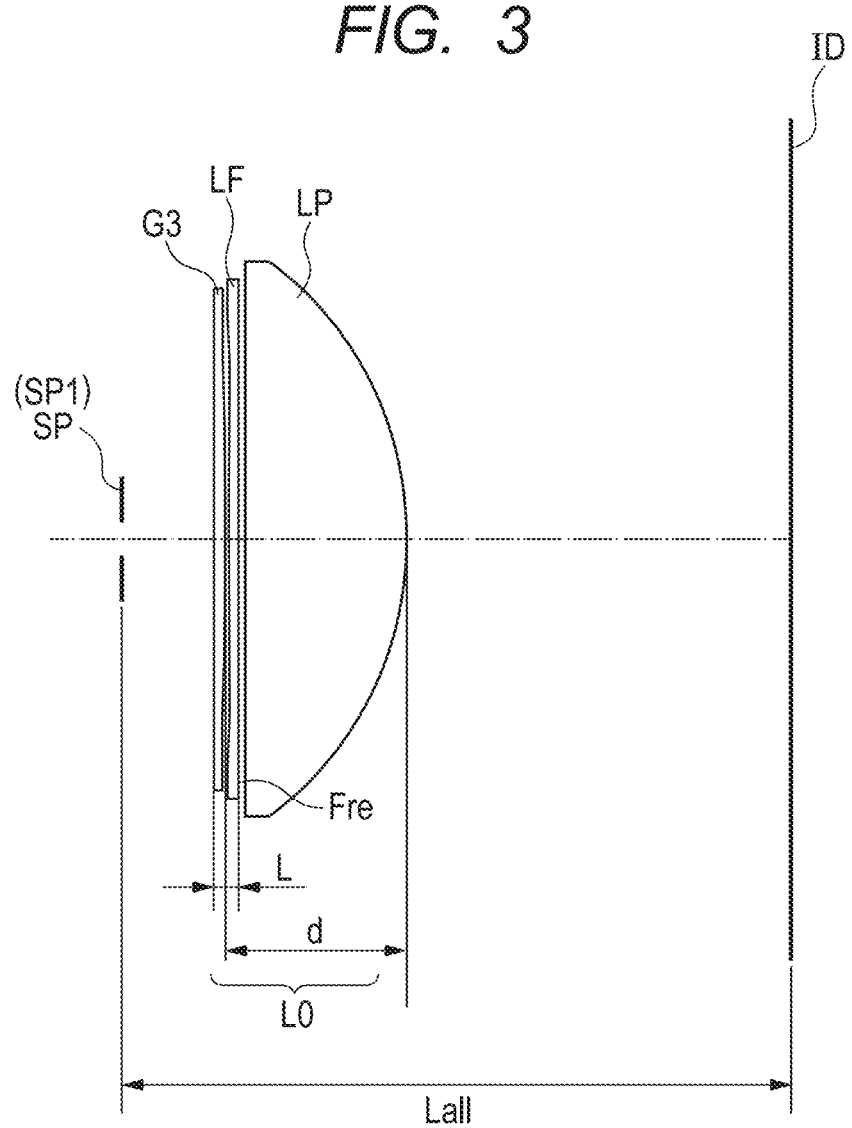

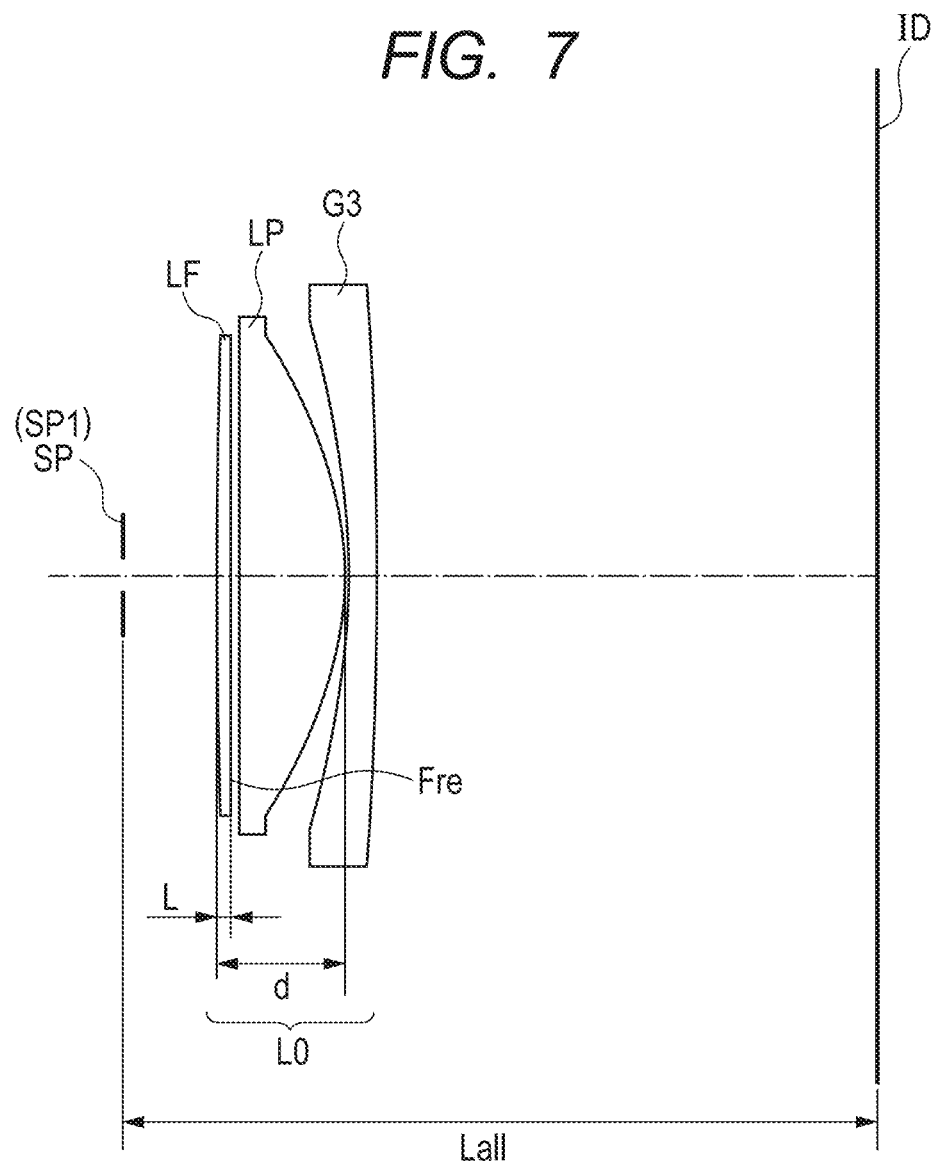

OBSERVATION OPTICAL SYSTEM AND OBSERVATION APPARATUS INCLUDING THE SAME

BACKGROUND OF THE INVENTION

Field of the Invention

The present invention relates to an observation optical system, which is suitable for a head-mounted display, which is configured to enlarge and display for observation an original image displayed on a liquid crystal display element or another image display element, for example.

Description of the Related Art

There have hitherto been proposed observation apparatus, such as a head-mounted display, which are configured to enlarge and display original images displayed using image display elements, such as a CRT and an LCD, via an observation optical system, and provide large-screen images to users to enable realistic observation. In recent years, the observation apparatus are desired to enable more realistic observation, and to that end, the observation optical systems used in the observation apparatus are required to support a wide angle of view and have high optical performance. Further, when used in observation apparatus of types to be worn on the head or held by the hand, the observation optical systems are required to be downsized and lightweight.

In the related art, there has been known an ocular video display device, in which a Fresnel lens is arranged in an optical path as the observation optical system achieving the wide angle of view and lightweight (Japanese Patent Application Laid-Open No. H07-244246).

In order to observe image information displayed on the image display element with the wide angle of view and the high optical performance, and to obtain the observation optical system that is lightweight as a whole, it is required to appropriately set a lens configuration, in particular, when a Fresnel lens is used, a shape and a lens configuration of the Fresnel lens, for example.

SUMMARY OF THE INVENTION

It is an object of the present invention to provide an observation optical system, with which image information displayed on an image display surface can be observed with a wide angle of view and high optical performance while achieving downsizing and lightweight of an entire system of the observation optical system, and an observation apparatus including the observation optical system.

According to one embodiment of the present invention, there is provided an observation optical system used for observing an image displayed on an image display surface, the observation optical system including, in order from an observation surface side to the image display surface side: a first lens having a positive refractive power; and a second lens having a positive refractive power, in which the first lens is a Fresnel lens, and in which the following conditional expression is satisfied:

$$1.50 < f1/f2 < 2.75,$$

where f1 is a focal length of the first lens, and f2 is a focal length of the second lens.

Further features of the present invention will become apparent from the following description of exemplary embodiments with reference to the attached drawings.

BRIEF DESCRIPTION OF THE DRAWINGS

FIG. 3 is a lens cross-sectional view of an observation optical system according to Example 2 of the present invention.

FIG. 7 is a lens cross-sectional view of an observation optical system according to Example 4 of the present invention.

FIG. 11 is an explanatory view of definitions of a length in an optical axis direction from a surface vertex to an end of a center ring and a length (step) of a grating wall surface of a Fresnel lens of an observation optical system according to the present invention, a diameter from the surface vertex to the end of the center ring of the Fresnel lens, an effective diameter of the Fresnel lens, and the like.

DESCRIPTION OF THE EMBODIMENTS

Now, exemplary embodiments of the present invention are described with reference to the accompanying drawings. An observation optical system according to the present invention is an observation optical system to be used to observe an image displayed on an image display surface. The observation optical system consists, in order from an observation surface side to an image display surface side, of a first lens having a positive refractive power, and a second lens having a positive refractive power. The first lens is formed of a Fresnel lens. The observation optical system according to the present invention may include a lens in addition to the first lens and the second lens.

Figure 1:
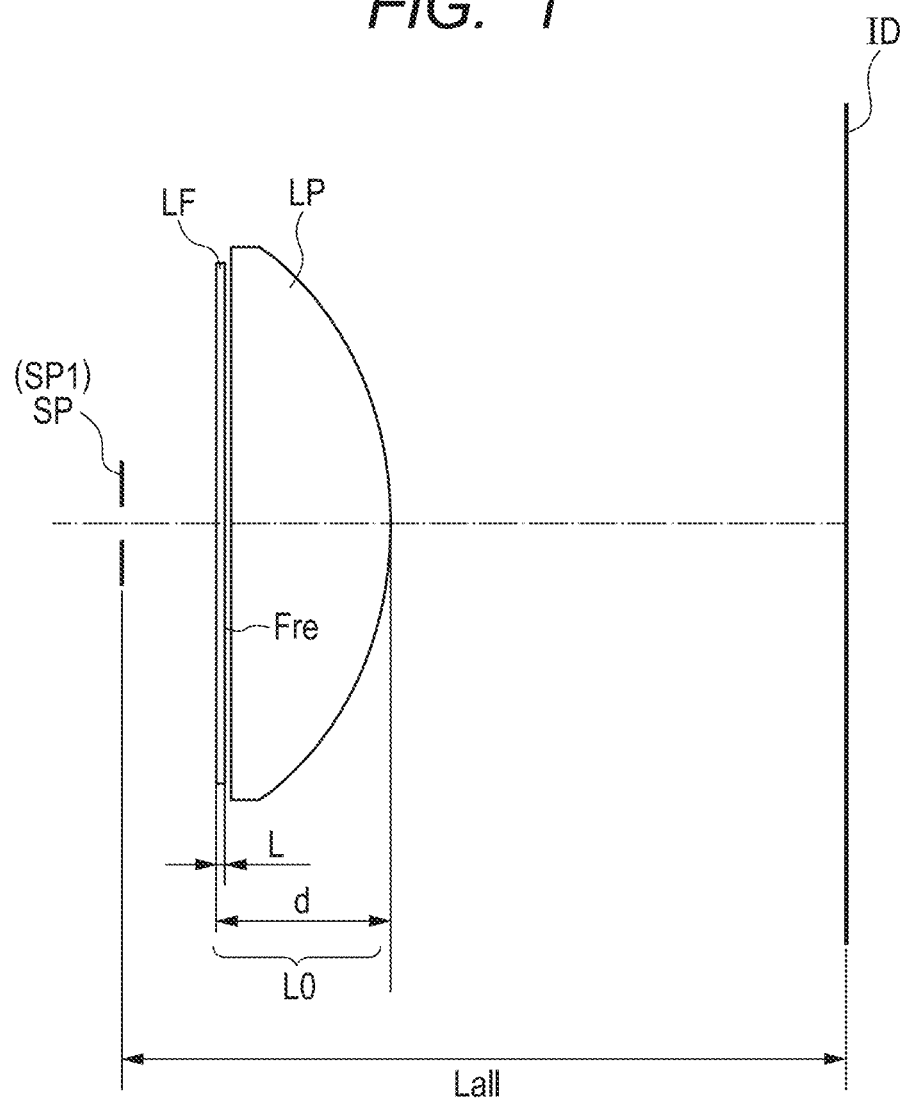
FIG. 1 is a lens cross-sectional view of an observation optical system according to Example 1 of the present invention.
Figure 2A:
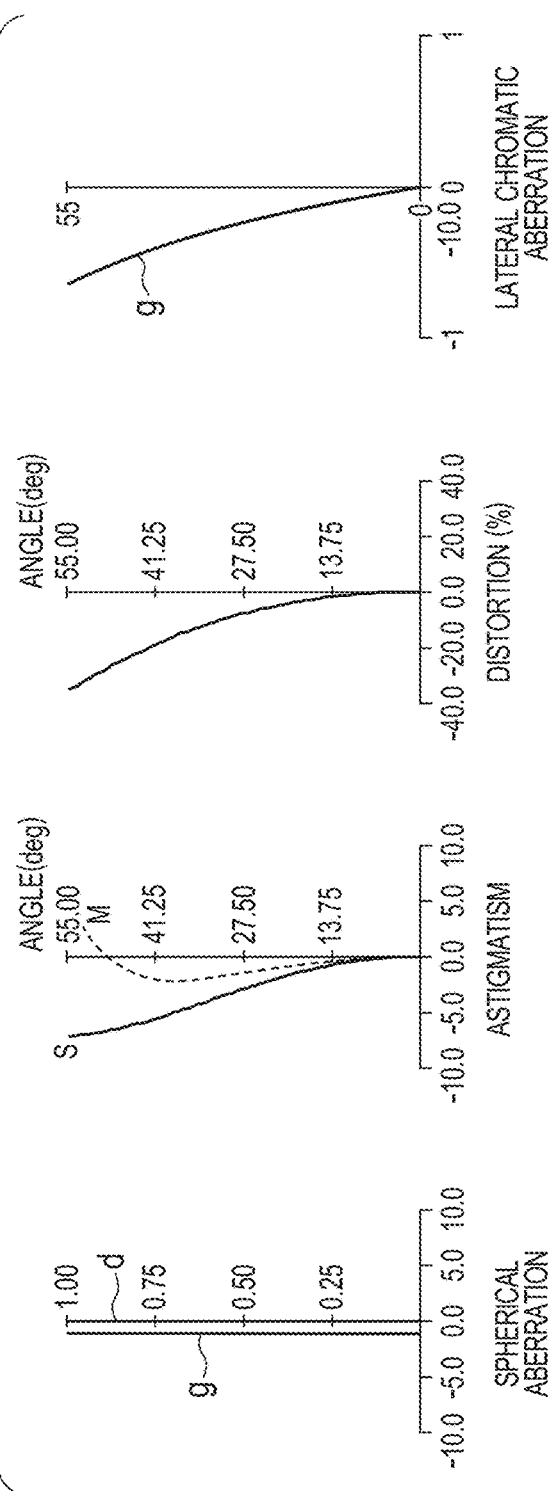
FIG. 2A is longitudinal aberration diagrams of the observation optical system according to Example 1 of the present invention with an eye relief of 10 mm.
Figure 2B:
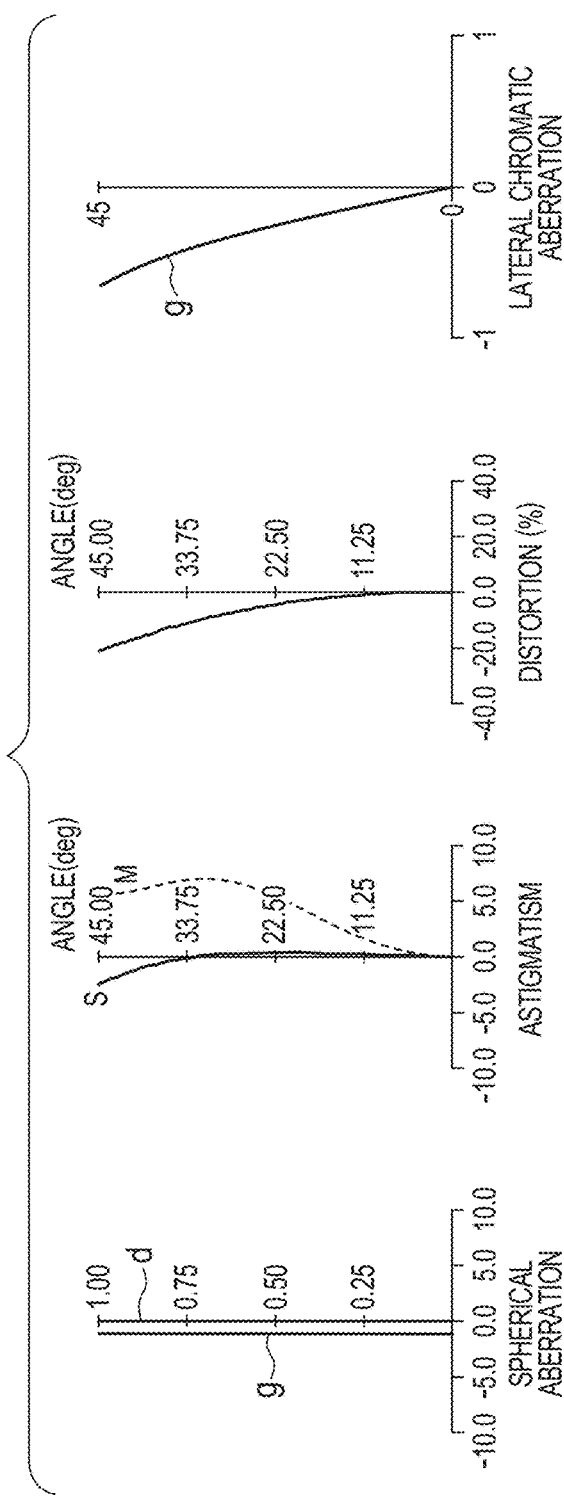
FIG. 2B is longitudinal aberration diagrams of the observation optical system according to Example 1 of the present invention with an eye relief of 20 mm.
Figures 4A, 4B:
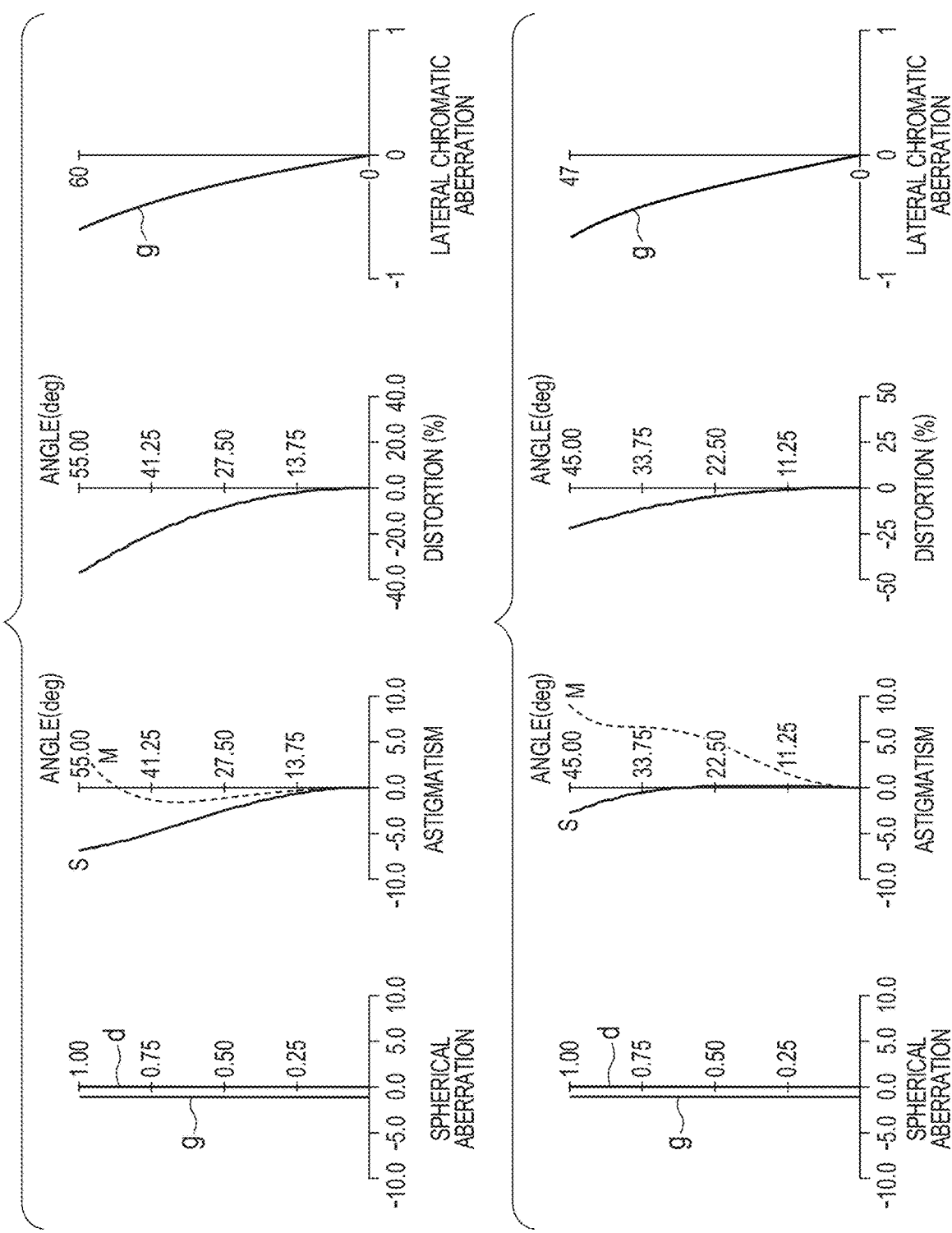
FIG. 4A is longitudinal aberration diagrams of the observation optical system according to Example 2 of the present invention with an eye relief of 10 mm.
FIG. 4B is longitudinal aberration diagrams of the observation optical system according to Example 2 of the present invention with an eye relief of 20 mm.
Figure 5:
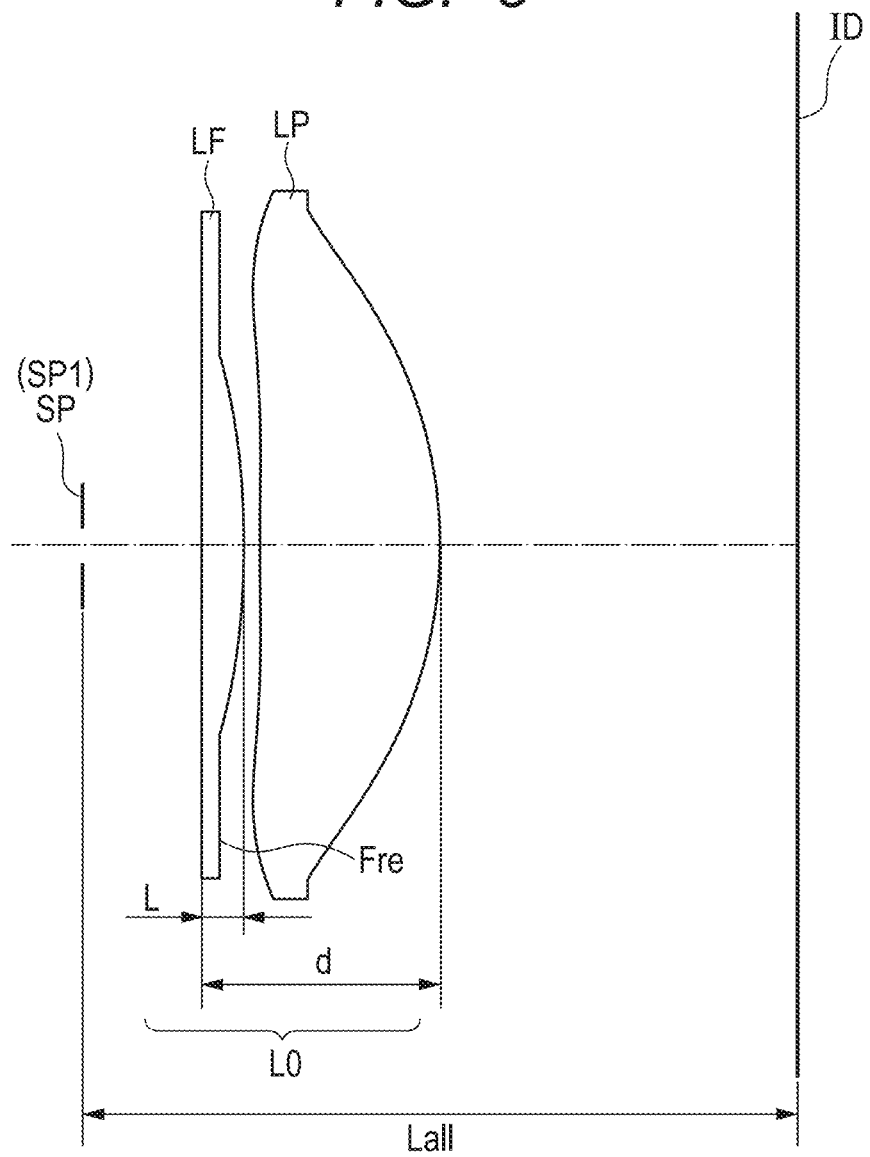
FIG. 5 is a lens cross-sectional view of an observation optical system according to Example 3 of the present invention.

FIG. 1 is a lens cross-sectional view of an observation apparatus including an observation optical system according to Example 1 of the present invention. FIG. 2A and FIG. 2B are longitudinal aberration diagrams of the observation optical system according to Example 1 of the present invention with an eye relief of 10 mm and an eye relief of 20 mm, respectively. FIG. 3 is a lens cross-sectional view of an observation apparatus including an observation optical system according to Example 2 of the present invention. FIG. 4A and FIG. 4B are longitudinal aberration diagrams of the observation optical system according to Example 2 of the present invention with an eye relief of 10 mm and an eye relief of 20 mm, respectively. FIG. 5 is a lens cross-sectional view of an observation apparatus including an observation optical system according to Example 3 of the present invention.

Figure 6A:
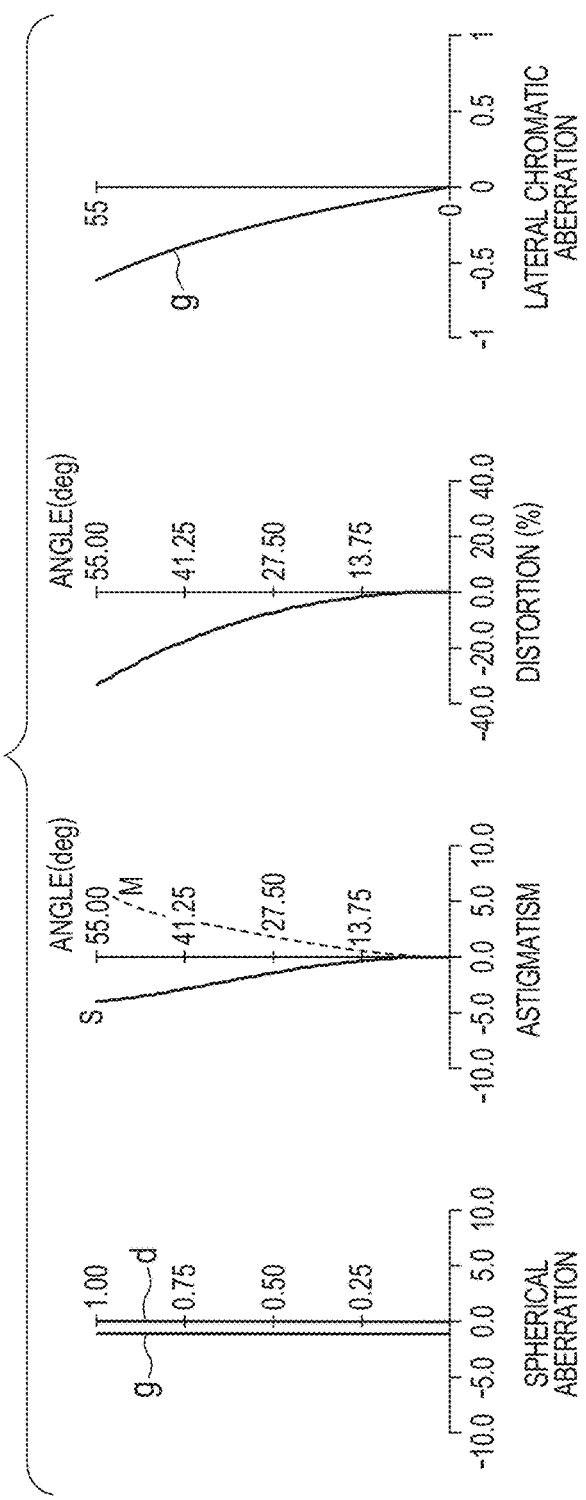
FIG. 6A is longitudinal aberration diagrams of the observation optical system according to Example 3 of the present invention with an eye relief of 10 mm.
Figure 6B:
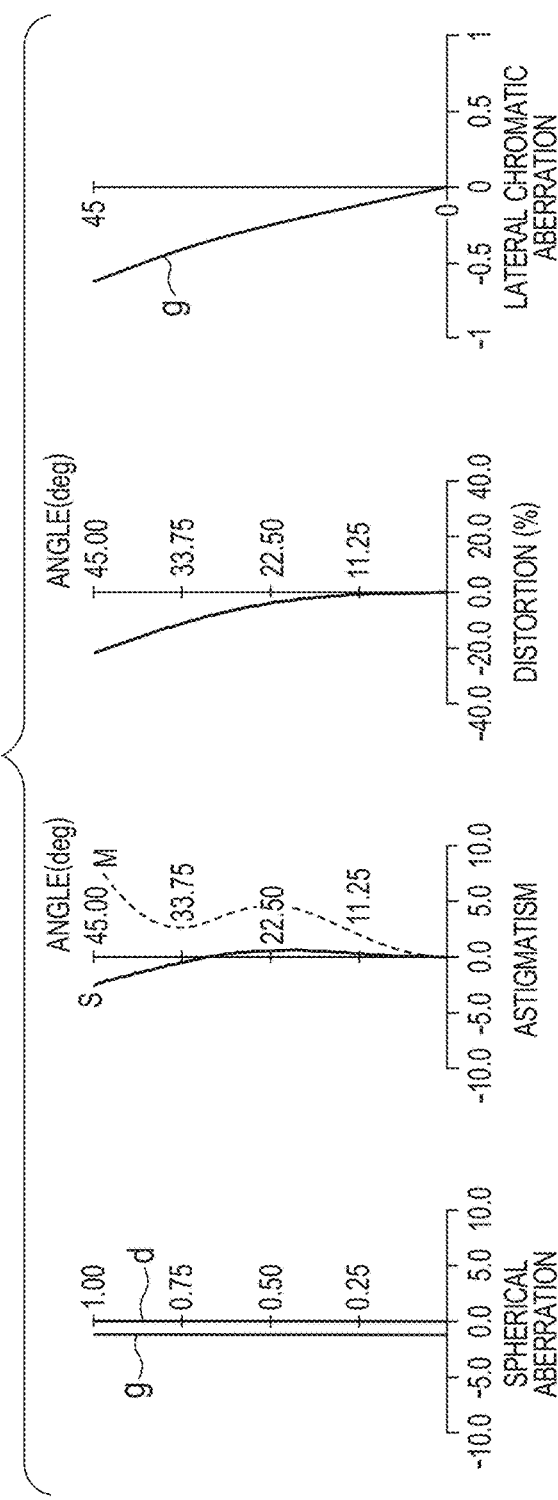
FIG. 6B is longitudinal aberration diagrams of the observation optical system according to Example 3 of the present invention with an eye relief of 20 mm.
Figure 8A:
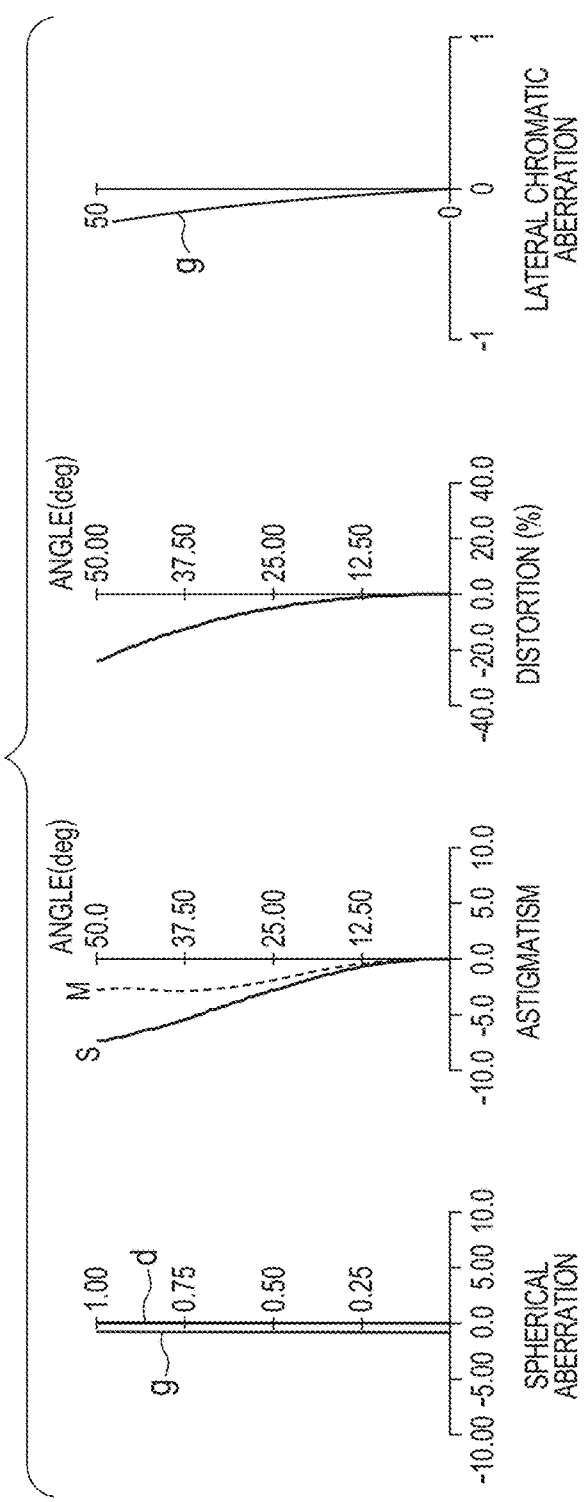
FIG. 8A is longitudinal aberration diagrams of the observation optical system according to Example 4 of the present invention with an eye relief of 10 mm.
Figure 8B:
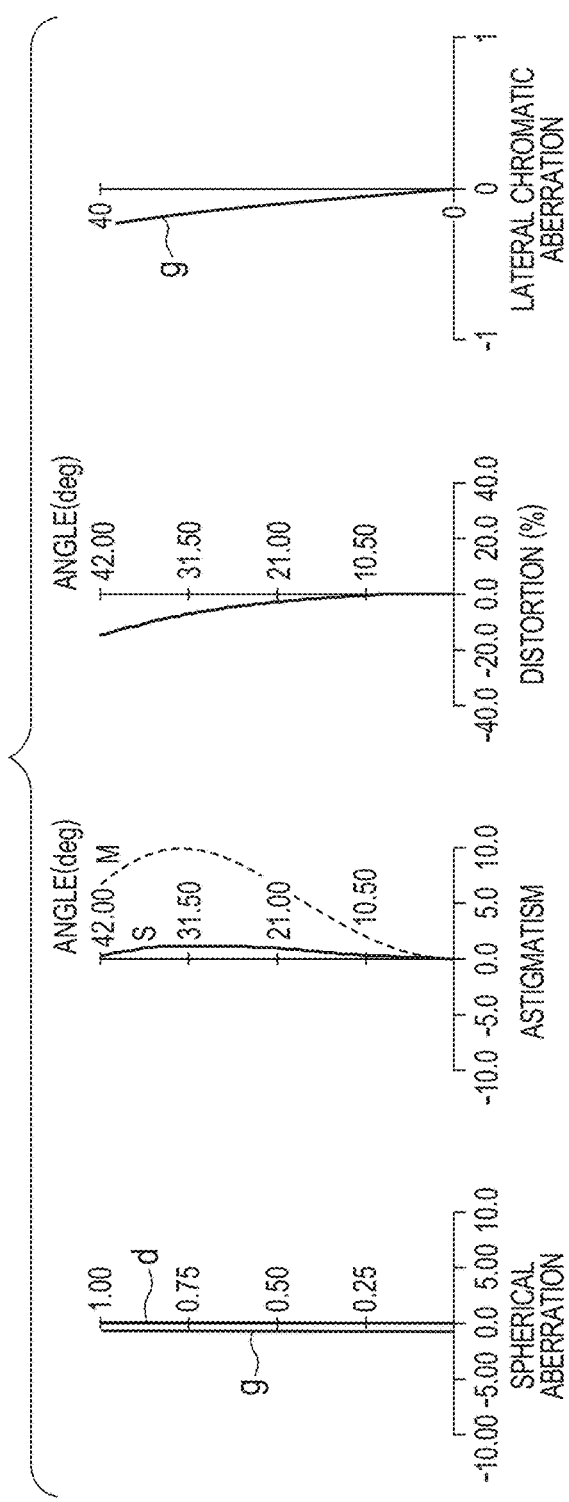
FIG. 8B is longitudinal aberration diagrams of the observation optical system according to Example 4 of the present invention with an eye relief of 20 mm.
Figure 9:
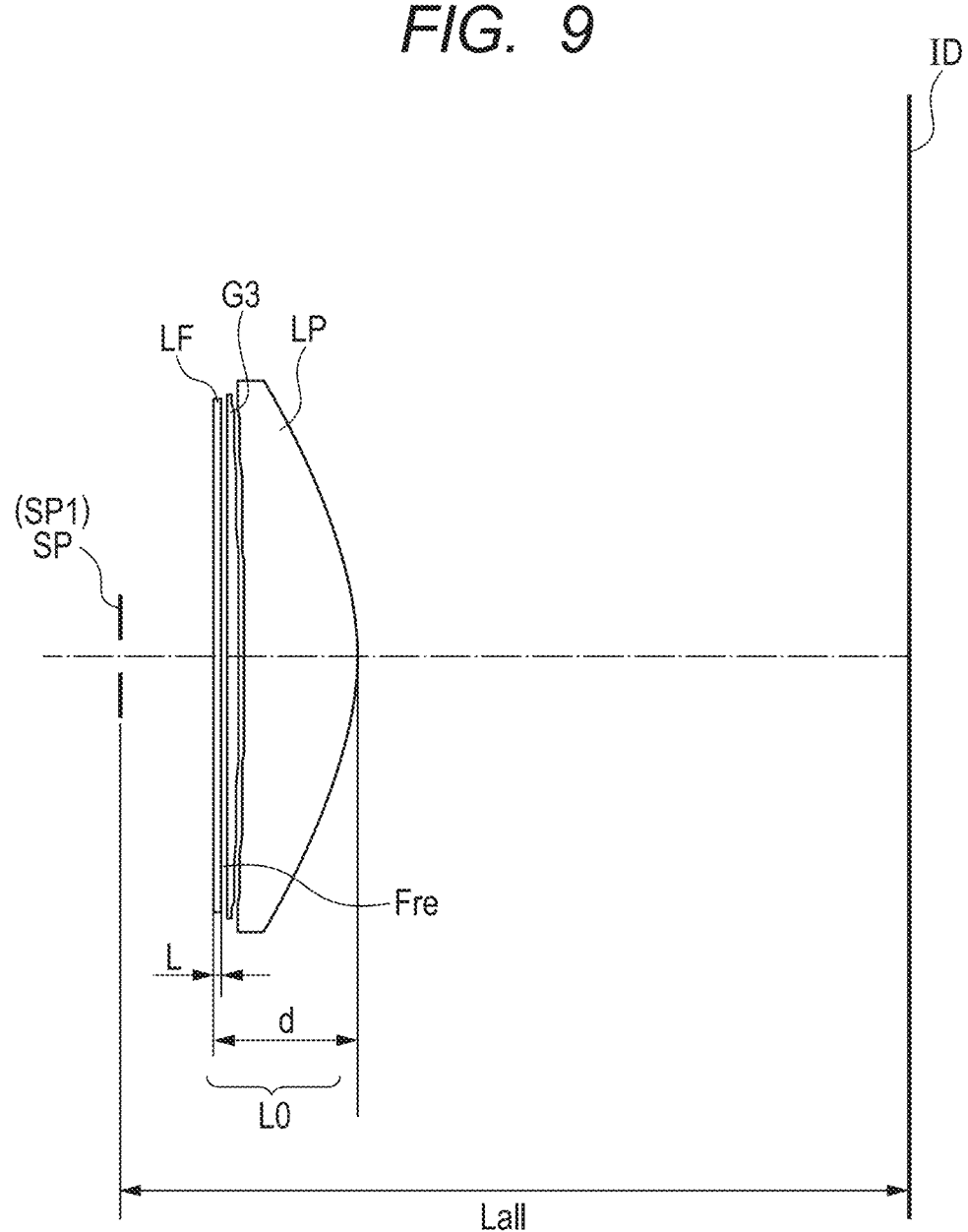
FIG. 9 is a lens cross-sectional view of an observation optical system according to Example 5 of the present invention.
Figure 10A:
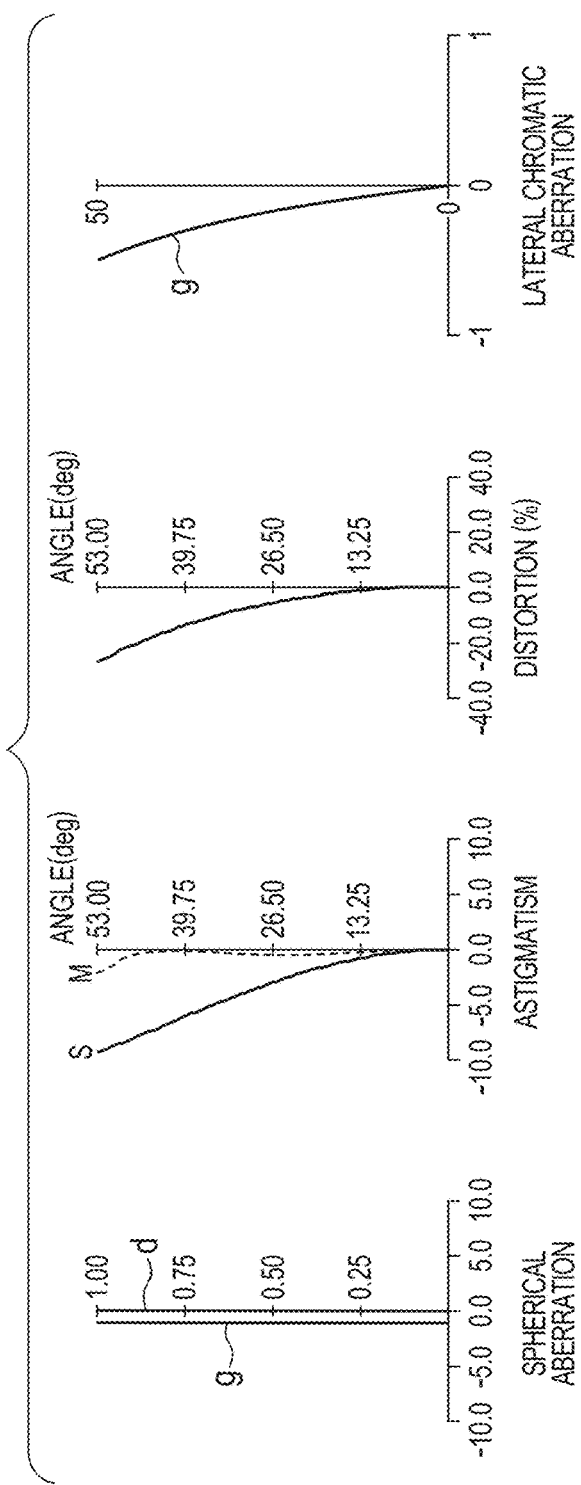
FIG. 10A is longitudinal aberration diagrams of the observation optical system according to Example 5 of the present invention with an eye relief of 10 mm.
Figure 10B:
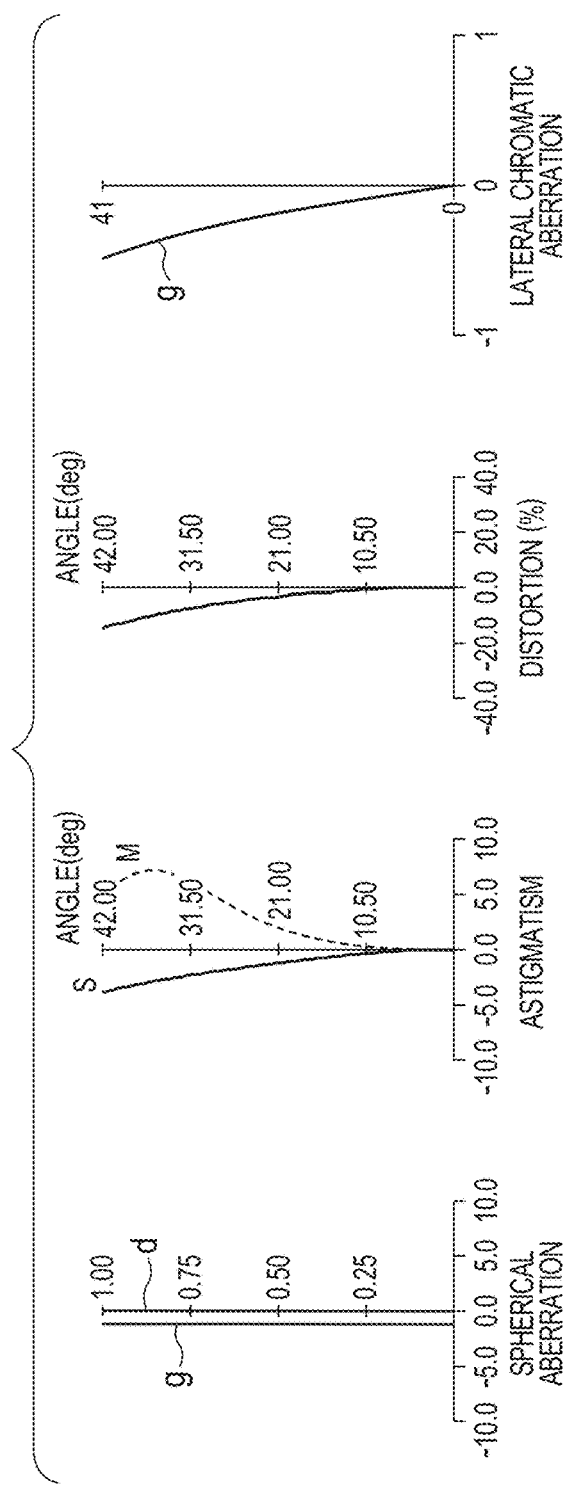
FIG. 10B is longitudinal aberration diagrams of the observation optical system according to Example 5 of the present invention with an eye relief of 20 mm.

FIG. 6A and FIG. 6B are longitudinal aberration diagrams of the observation optical system according to Example 3 of the present invention with an eye relief of 10 mm and an eye relief of 20 mm, respectively. FIG. 7 is a lens cross-sectional view of an observation apparatus including an observation optical system according to Example of the present invention. FIG. 8A and FIG. 8B are longitudinal aberration diagrams of the observation optical system according to Example 4 of the present invention with an eye relief of 10 mm and an eye relief of 20 mm, respectively. FIG. 9 is a lens cross-sectional view of an observation apparatus including an observation optical system according to Example 5 of the present invention. FIG. 10A and FIG. 10B are longitudinal aberration diagrams of the observation optical system according to Example 5 of the present invention with an eye relief of 10 mm and an eye relief of 20 mm, respectively.

Figure 11:
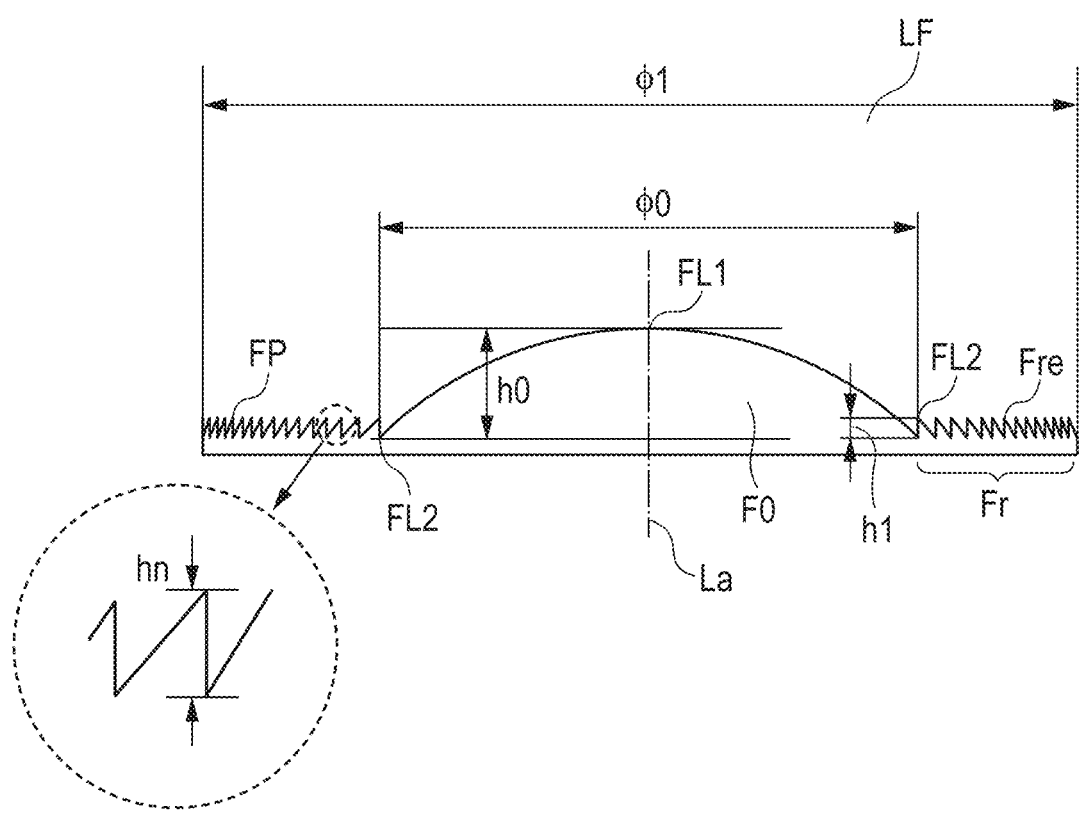
Figure 12A:
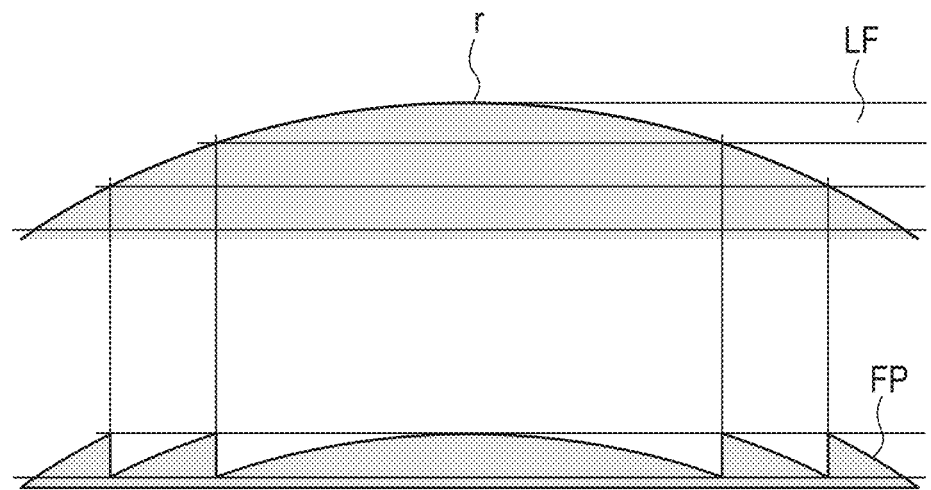
FIG. 12A is an explanatory view of a Fresnel surface.
Figure 12B:
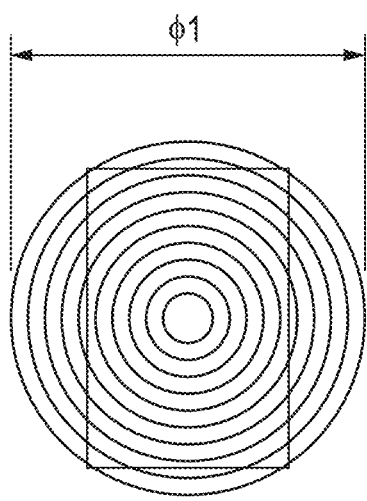
FIG. 12B is an explanatory view of the Fresnel surface.
Figure 12C:
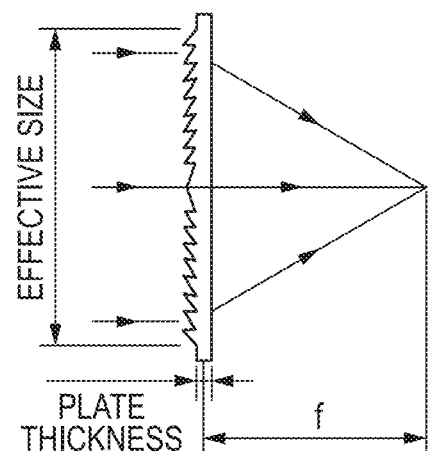
FIG. 12C is an explanatory view of the Fresnel surface.

FIG. 11 is a view for illustrating definitions of a length in an optical axis direction from a surface vertex to an end of a center ring and a length (step) of a wall surface of a Fresnel surface of the first lens in the present invention. FIG. 12A, FIG. 12B, and FIG. 12C are explanatory views of the Fresnel lens in the present invention.

In the lens cross-sectional views, an observation optical system L0, a first lens LF having a positive refractive power, which is formed of a Fresnel lens, and a second lens LP having a positive refractive power are illustrated. In this case, the second lens LP is a lens having a lens surface that is a curved surface having a curvature, and having a refracting action at the curved surface, and does not have the Fresnel surface. At an image display surface ID, a liquid crystal display element or another image display element is arranged, for example. At an observation surface SP, a pupil (eye point) of an observer is located. A stop (SP1) may be arranged at the observation surface SP.

In the lens cross-sectional view of each Example, the eye relief represents an interval between the eye point (SP) and a lens surface closest to the observation surface SP side on an optical axis.

In the aberration diagrams, there are illustrated, in order from the left, spherical aberration, astigmatism, distortion, and lateral chromatic aberration. In the spherical aberration diagram, spherical aberration with respect to a d-line (wavelength: 587.6 nm) and a g-line (wavelength: 435.8 nm) is illustrated. In the astigmatism diagram, astigmatisms at a sagittal image plane and a meridional image plane are denoted by S and M, respectively. The distortion is illustrated for the d-line. In the lateral chromatic aberration diagram, lateral chromatic aberration of the g-line is illustrated.

In evaluation of the aberrations, aberrations of a ray reaching the observation surface side with an emission point being provided on the image display surface ID side and aberrations of a ray reaching the image display surface ID side with an emission point being provided on the observation surface SP side have one-to-one correspondence, and hence the aberrations at the image display surface ID are evaluated for convenience. Moreover, an aperture stop diameter of the stop SP in each Example is set to 3.5 mm as an example of a pupil diameter of a person. Moreover, in the present invention, in order to support an eye relief that individually varies or a state of wearing eyeglasses, variations in aberration due to the eye relief are suppressed. Therefore, aberrations for the eye reliefs of 10 mm and 20 mm are illustrated representatively.

FIG. 11 is an explanatory view for defining elements of the Fresnel surface of the first lens LF in the present invention. In a Fresnel surface Fre, a plurality of concentric gratings FP are arranged with a predetermined grating pitch. A center ring F0 is a continuous surface, and is formed of a spherical surface, an aspherical surface, or the like. An optical axis is denoted by La. An effective diameter of the Fresnel surface is denoted by $\Phi 1$. An effective diameter of the center ring F0 of the Fresnel surface Fre is denoted by $\Phi 0$. In other words, the effective diameter $\Phi 0$ is a diameter from one end FL2 to the other end FL2 of the center ring F0. A Fresnel ring in which the gratings are formed is denoted by Fr.

In FIG. 11, a length in an optical axis La direction from a surface vertex FL1 to the end FL2 of the center ring F0 of the Fresnel surface Fre of the first lens LF is denoted by h0, and a length of a wall surface of an n-th grating (ring) counted from the optical axis La is denoted by hn. A length in the optical axis direction of a grating wall surface of a first ring adjacent to the center ring F0 of the Fresnel surface Fre of the first lens LF is denoted by h1.

Next, a configuration of the observation optical system L0 according to the present invention is described. The observation optical system L0 according to the present invention includes the first lens LF having the positive refractive power, and the second lens LP having the positive refractive power. The first lens LF is formed of a Fresnel lens. The observation optical system L0 is formed of a plurality of lenses to reduce a curvature of each surface, to thereby reduce an amount of generated aberration at each surface, and also reduce an amount of aberration as a whole.

Then, as compared to the second lens LP, the first lens LF is arranged closer to the observation surface SP side. As a result, unnecessary light (ghost) due to defective molding (surface sag) or the like of a protruding portion of the grating of the Fresnel surface is prevented from increasing an amount of diopter deviation at a focus position of the observer, to thereby increase visibility and optical performance.

In each Example, a focal length of the first lens LF is denoted by f1, and a focal length of the second lens LP is denoted by f2. At this time, the observation optical system according to the present invention satisfies the following conditional expression:

$$1.50 < f1/f2 < 2.75 \tag{1}$$

Next, technical meanings of the above-mentioned conditional expression are described. The conditional expression (1) defines a ratio between a refractive power of the first lens LF having the positive refractive power and a refractive power of the second lens LP having the positive refractive power. The positive refractive power of the second lens LP is set larger than the positive refractive power of the first lens LF. As a result, the grating pitch of the first lens LF is prevented from becoming much smaller, or a proportion of a step of the grating to an effective surface is prevented from becoming much larger, to thereby obtain high optical performance.

When the ratio falls below the lower limit of the conditional expression (1), and the positive refractive power of the first lens LF becomes much stronger, the grating pitch of the first lens LF becomes much smaller, or the proportion of the step of the grating to the effective surface becomes much larger. As a result, flare due to diffraction and the unnecessary light due to the step is generated in large amounts, and the optical performance is reduced.

In contrast, when the ratio exceeds the upper limit of the conditional expression (1), and the positive refractive power of the second lens LP becomes much stronger, field curvature and astigmatism are mainly increased. Moreover, a thickness deviation ratio of the second lens LP becomes much larger, and hence a weight is disadvantageously increased.

It is more preferred to set the numerical value range of the conditional expression (1) as follows:

$$1.55 < f1/f2 < 2.65 \quad (1a).$$

It is more preferred to set the numerical value range of the conditional expression (1a) as follows:

$$1.57 < f1/f2 < 2.55 \quad (1b).$$

With the above-mentioned configuration, the observation optical system having a wide field of view and the high optical performance, and being lightweight is obtained.

In the observation optical system L0 of the present invention, the surface on the image display surface ID side of the first lens LF is desirably formed of the Fresnel surface Fre. When a shape concentric to the stop corresponding to the eye of a person is formed, the optical performance is increased. In other words, a curvature of the surface on the image display surface ID side becomes larger in view of increasing the optical performance. Therefore, the surface on the image display surface ID side is formed of the Fresnel surface Fre to achieve lightweight.

Further, in the observation optical system L0, the surface on the observation surface SP side of the first lens LF desirably has a continuous surface shape without a step in a ray effective area. When a shape concentric to the stop corresponding to the eye of a person is formed, the optical performance is increased, and hence a curvature of the surface on the observation surface SP side becomes smaller. Therefore, even when the surface on the observation surface SP side has the continuous shape, an increase in weight of the Fresnel surface Fre is small, and hence the weight does not become larger. Further, occurrences of the flare due to the diffraction and the unnecessary light due to the step are reduced.

In each Example, it is more preferred to satisfy one or more of the following conditional expressions. A focal length of an entire system of the observation optical system is denoted by f, and a distance from a lens surface on the observation surface side of the lens that is located closest to the observation surface side to the lens surface on the image display surface side of the first lens LF is denoted by L. A length in the optical axis direction of the grating wall surface of the first ring adjacent to the center ring of the Fresnel surface of the first lens is denoted by h1, and a length of the wavelength of the d-line is denoted by $\lambda d$.

A curvature radius of the surface on the observation surface SP side of the first lens LF is denoted by R11, and a curvature radius of the surface on the image display surface ID side of the first lens LF is denoted by R12. A curvature radius of a surface on the observation surface SP side of the second lens LP is denoted by R21, and a curvature radius of a surface on the image display surface ID side of the second lens LP is denoted by R22. A distance from the surface on the observation surface SP side of the first lens LF to the surface on the image display surface ID side of the second lens LP is denoted by d. In an observation apparatus including the observation optical system L0 and an image display element configured to display image information, which is used to observe from the observation surface SP side the image information of the image display element enlarged by the observation optical system L0, it is preferred to satisfy one or more of the following conditional expressions.

An actual image height of the image display surface ID at an eye relief of 10 mm and a half angle of view of 45° is denoted by y, and a distance from the observation surface SP to the image display surface ID with the eye relief of 10 mm is denoted by Lall. An ideal image height of the image display surface ID at the eye relief of 10 mm and the half angle of view of 45° is denoted by y0. At this time, it is preferred to satisfy one or more of the following conditional expressions.

$$0.01 < L/f < 0.09 \quad (2)$$

$$50.0 < h1/\lambda d < 500.0 \quad (3)$$

$$-1.5 < (R12+R11)/(R12-R11) < -0.8 \quad (4)$$

$$-1.5 < (R22+R21)/(R22-R21) < -0.6 \quad (5)$$

$$0.20 < d/f < 0.45 \quad (6)$$

$$0.5 < y/\text{Lall} < 0.8 \quad (7)$$

$$-0.30 < (y-y0)/y0 < -0.15 \quad (8)$$

Next, technical meanings of each of the above-mentioned conditional expressions are described. The conditional expression (2) defines a ratio between the distance from the lens surface closest to the observation surface SP side in the observation optical system to the lens surface on the image display surface ID side of the first lens LF and the focal length of the entire system. When the ratio falls below the lower limit of the conditional expression (2), the first lens LF becomes much thinner such that the lens becomes easier to deform, and the optical performance is disadvantageously reduced. In contrast, when the ratio exceeds the upper limit of the conditional expression (2), the Fresnel surface becomes closer to a focus position of the observation surface SP, and the unnecessary light (ghost) due to the defective molding (surface sag) or the like of the protruding portion of the grating of the Fresnel surface is generated in a large amount.

The conditional expression (3) defines a ratio between the height (amount of step of the grating) of the grating wall surface of the first ring of the Fresnel surface Fre and the length of the wavelength of the d-line. When the ratio falls below the lower limit of the conditional expression (3), the step of the grating of the Fresnel surface of the first lens LF becomes much smaller to increase an intensity of diffracted light, and the optical performance is reduced. In contrast, when the ratio exceeds the upper limit of the conditional expression (3), the amount of step of the grating of the Fresnel surface of the first lens LF becomes much larger to increase a proportion of light that has entered the grating wall surface, with the result that the unnecessary light (ghost) is generated in a large amount, and that the optical performance is reduced.

The conditional expression (4) defines form factors of the first lens LF having the positive refractive power. When the ratio falls below the lower limit of the conditional expression (4), the curvature of the surface on the image display surface ID side becomes much larger, and field curvature and astigmatism are mainly increased. In contrast, when the ratio exceeds the upper limit of the conditional expression (4), the curvature of the surface on the observation surface SP side of the first lens LF becomes much larger, and field curvature and astigmatism are mainly increased.

The conditional expression (5) defines form factors (lens form) of the second lens LP having the positive refractive power. When the ratio falls below the lower limit of the conditional expression (5), the curvature of the surface on the image display surface ID side becomes much larger, and field curvature and astigmatism are mainly increased. In contrast, when the ratio exceeds the upper limit of the conditional expression (5), the curvature of the surface on the observation surface SP side of the second lens LP becomes much larger, and field curvature and astigmatism are mainly increased.

The conditional expression (6) defines a ratio between the distance from the lens surface on the observation surface SP side of the first lens LF having the positive refractive power to the lens surface on the image display surface ID side of the second lens LP having the positive refractive power and the focal length of the entire system.

When the ratio falls below the lower limit of the conditional expression (6), an interval between the lenses becomes much smaller, and it becomes more difficult to mechanically hold the respective members. Alternatively, thicknesses of the lenses become much smaller such that the lens surfaces become easier to deform, and the optical performance tends to be reduced. In contrast, when the ratio exceeds the upper limit of the conditional expression (6), and the interval between the lenses becomes much larger, an effective diameter of the lens located on the image display surface ID side in particular becomes larger, and the weight is increased. Alternatively, the thicknesses of the lenses become much larger, and the weight is increased.

The conditional expression (7) defines a ratio between the actual image height of the image display surface ID at the eye relief of 10 mm and the half angle of view 45° and the distance from the eye point to the image display surface ID at the eye relief of 10 mm. When the ratio falls below the lower limit of the conditional expression (7), and the distance from the eye point to the image display surface ID is too long, a mechanical configuration forming the observation optical system L0 becomes longer, and the weight is increased. In contrast, when the ratio exceeds the upper limit of the conditional expression (7), and the actual image height of the image display surface ID at the eye relief of 10 mm and the half angle of view of 45° becomes much larger, a size of the image display surface ID is increased, and the weight is increased.

The conditional expression (8) defines an amount of distortion on the image display surface ID at the eye relief of 10 mm and the half angle of view of 45°. When the ratio falls below the lower limit of the conditional expression (8), the positive refractive power is too strong, and hence a light beam around a screen is bent strongly in the optical axis direction, with the result that various off-axis aberrations are increased. In contrast, when the ratio exceeds the upper limit of the conditional expression (8), the positive refractive power is too small, and hence an incidence height of the light beam around the screen at each lens position becomes much larger to increase the effective diameter, and hence the weight is increased.

With the above-mentioned configuration, the observation optical system having a wide angle of view and the high optical performance and being lightweight is easily obtained.

It is more preferred to set the numerical value range of the conditional expressions (2) to (8) as follows.

$$0.012 < L/f < 0.085 \tag{2a}$$

$$75.0 < h1/\lambda d < 450.0 \tag{3a}$$

$$-1.4 < (R12+R11)/(R12-R11) < -0.9 \tag{4a}$$

$$-1.40 < (R22+R21)/(R22-R21) < -0.65 \tag{5a}$$

$$0.21 < d/f < 0.44 \tag{6a}$$

$$0.55 < y/\text{Lall} < 0.75 \tag{7a}$$

$$-0.27 < (y-y0)/y0 < -0.17 \tag{8a}$$

It is more preferred to set the numerical value range of the conditional expressions (2a) to (8a) as follows.

$$0.014 < L/f < 0.080 \tag{2b}$$

$$100.0 < h1/\lambda d < 400.0 \tag{3b}$$

$$-1.30 < (R12+R11)/(R12-R11) < -0.95 \tag{4b}$$

$$-1.30 < (R22+R21)/(R22-R21) < -0.70 \tag{5b}$$

$$0.215 < d/f < 0.430 \tag{6b}$$

$$0.59 < y/\text{Lall} < 0.70 \tag{7b}$$

$$-0.25 < (y-y0)/y0 < -0.18 \tag{8b}$$

EXAMPLE 1

Referring to FIG. 1, an observation optical system L0 according to Example 1 of the present invention is described. The observation optical system L0 according to Example 1 consists, in order from an observation surface SP side to an image display surface ID side, of a first lens LF having a positive refractive power, and a second lens LP having a positive refractive power. The positive refractive powers of surfaces on the image display surface ID side are shared by two lenses to reduce curvatures of the respective surfaces on the image display surface ID side and suppress occurrences of various aberrations.

The positive refractive power of the second lens LP is increased in an appropriate range satisfying the conditional expression (1) to prevent the grating pitch of the first lens LF from becoming much smaller, or prevent the proportion of the step of the grating to the effective surface from becoming much larger, to thereby obtain the high optical performance. Further, the image display surface ID side of the first lens LF is formed of the Fresnel surface to facilitate weight reduction when the curvature of the surface on the image display surface ID side is increased to improve the optical performance.

Further, the surface on the observation surface SP side of the first lens LF is formed of the continuous surface shape without a step in the ray effective area to prevent the occurrences of the flare due to the diffraction by the Fresnel structure and the unnecessary light caused by the step. Further, the first lens LF may be brought closer to the observation surface SP side in an appropriate range satisfying the conditional expression (2) to deviate the diopter from the focus position of the observer, to thereby reduce the occurrence of the unnecessary light (ghost) due to the defective molding (surface sag) or the like of the protruding portion of the grating of the Fresnel surface.

Further, the amount of step of the grating of the first ring of the Fresnel surface of the first lens LF is reduced in an appropriate range satisfying the conditional expression (3), to thereby reduce the proportion of the light entering the grating wall surface, and hence reduce the unnecessary light (ghost). Further, the curvature of the surface on the image display surface ID is increased as compared to the curvature of the surface on the observation surface SP side of the first lens LF in an appropriate range satisfying the conditional expression (4) such that a convex shape faces the surface on the image display surface ID side. As a result, the shape concentric to the surface on the observation surface SP side is formed to reduce an angle of incidence of an off-axis ray, to thereby suppress the occurrences of the various off-axis aberrations.

Further, the curvature of the surface on the image display surface ID side is increased as compared to the curvature of the surface on the observation surface SP side of the second lens LP in an appropriate range satisfying the conditional expression (5) such that a convex shape faces the surface on the image display surface ID side. As a result, the shape concentric to the surface on the observation surface SP side is formed to reduce the angle of incidence of the off-axis ray, to thereby reduce the occurrences of the various off-axis aberrations. Further, the distance from the lens surface on the observation surface SP side of the first lens LF to the lens surface on the image display surface ID side of the second lens LP is reduced in an appropriate range satisfying the conditional expression (6) to reduce an effective diameter, to thereby reduce the weight of the second lens LP, in particular.

Further, the distance from the observation surface SP to the image display surface ID is reduced in an appropriate range satisfying the conditional expression (7) to reduce the weight of the observation optical system L0. Further, the amount of distortion is set appropriately to satisfy the conditional expression (8) such that the light beam around the screen is prevented from being strongly bent in the optical axis direction, and the optical performance is improved.

EXAMPLE 2

Referring to FIG. 3, an observation optical system L0 according to Example 2 of the present invention is described. The observation optical system L0 according to Example 2 consists, in order from an observation surface SP side to an image display surface ID side, of a lens G3 having a positive refractive power, a first lens LF having a positive refractive power, and a second lens LP having a positive refractive power. The lens G3 is formed of a Fresnel lens. The lens G3 has a Fresnel surface on the observation surface SP side. The lens G3 shares the positive refractive power with the first lens LF to prevent grating pitches from becoming much smaller in the respective Fresnel surfaces. The remaining configuration is the same as in Example 1.

EXAMPLE 3

Referring to FIG. 5, an observation optical system L0 according to Example 3 of the present invention is described. The observation optical system L0 according to Example 3 consists, in order from an observation surface SP side to an image display surface ID side, of a first lens LF having a positive refractive power, and a second lens LP having a positive refractive power. The first lens LF has a Fresnel surface on the image display surface ID side. The length h0 in the optical axis direction from the surface vertex FL1 to the end FL2 of the center ring F0 of the first lens LF is increased to increase a proportion of a region of the continuous shape in a radial direction of the first lens LF having the positive refractive power, to thereby increase the optical performance in a screen range in which a person gazes easily. The remaining configuration is the same as in Example 1.

EXAMPLE 4

Referring to FIG. 7, an observation optical system L0 according to Example 4 of the present invention is described. The observation optical system L0 according to Example 4 consists, in order from an observation surface SP side to an image display surface ID side, of a first lens LF having a positive refractive power, a second lens LP having a positive refractive power, and a lens G3 having a negative refractive power. The lens G3 having the negative refractive power is arranged at a position where a ray at a peripheral angle of view is high to mainly and satisfactorily correct lateral chromatic aberration. The remaining configuration is the same as in Example 1.

EXAMPLE 5

Referring to FIG. 9, an observation optical system L0 according to Example 5 of the present invention is described. The observation optical system L0 according to Example 5 consists, in order from an observation surface SP side to an image display surface ID side, of a first lens LF having a positive refractive power, a lens G3 having a negative refractive power, and a second lens LP having a positive refractive power. The lens G3 is formed of a Fresnel lens. The lens G3 has a Fresnel surface on the observation surface SP side. For a concave surface of the lens G3, the observation surface SP side forms a concentric shape.

Then, the curvature of the surface on the observation surface SP side is increased to reduce occurrences of various off-axis aberrations. The lens G3 has a Fresnel surface on the observation surface SP side with the increased curvature to suppress the occurrences of the various off-axis aberrations and achieve the lightweight of the entire system. The remaining configuration is the same as in Example 1.

The exemplary embodiments of the present invention are described above, but the present invention is not limited to those embodiments and can be modified and changed variously within the scope of the gist thereof. For example, when the observation optical system described above is combined with a CRT, an LCD, or another image display element, electric processing may be added to the display side depending on an amount of distortion and an amount of lateral chromatic aberration.

In each Example, the Fresnel surface of the Fresnel lens divides a lens surface having a curvature radius r into a plurality of concentric regions as illustrated in FIG. 12A. At this time, a shape is formed in which gratings FP having a saw-tooth cross-sectional shape are arranged concentrically in a plane depending on a value of the curvature radius r. The plurality of concentric gratings have different angles or the same angle. Moreover, the grating pitch of the gratings is different or the same from the center (optical axis) to the periphery.

The curvature radius r of the Fresnel surface Fre corresponds to the curvature radius r of the lens surface illustrated in FIG. 12A. As one of parameters in determining a focal length of the Fresnel surface, the curvature radius r is used as in determining a focal length of a normal lens. The focal length f, a plate thickness (center thickness), the effective diameter $\Phi1$, and the like of the Fresnel lens are as illustrated in FIG. 12B and FIG. 12C. As a curvature radius of the Fresnel surface in the conditional expression to be described below, the curvature radius r of the lens surface before being formed into the Fresnel shape is used.

Next, Numerical Data in each Example is provided below. In Numerical Data, the order of a surface from the observation surface is denoted by i, a curvature radius of the i-th optical surface is denoted by ri, a lens thickness and an air interval between the i-th surface and the (i+1)-th surface is denoted by di, and a refractive index and an Abbe number of an optical member between the i-th surface and the (i+1)-th surface with respect to the d-line are denoted by ni and vi, respectively. Moreover, aspherical coefficients K, A4, A6, A8, and A10 are listed for the aspherical surface. When a displacement in the optical axis direction at a position of a height h from the optical axis is denoted by x with reference to the surface vertex, an aspherical shape is defined by the following expression.

$$x=(h^2/R)/[1+\{1-(1+k)(h/R)^2\}^{1/2}]+A4h^4+A6h^6+A8h^8+A10h^{10}$$

In this expression, R is a curvature radius. The Fresnel surface represents an ideal thin state having an aspherical effect, and has a Fresnel shape in the indicated center thickness d as an actual shape. The Fresnel surface is indicated by *Fre to the right of surface numbers. In surface numbers of each item of Numerical Data, 1 corresponds to the observation surface (stop), and the image plane corresponds to the image display surface.

In Numerical Data 1, the surface numbers 2 and 3 correspond to the first lens LF, and the surface numbers 4 and 5 correspond to the second lens LP. In Numerical Data 2, the surface numbers 6 and 7 correspond to the second lens LP, and the surface numbers 3 and 4 correspond to the first lens LF. In Numerical Data 3, the surface numbers 4 and 5 correspond to the second lens LP, and the surface numbers 2 and 3 corresponds to the first lens LF. In Numerical Data 4, the surface numbers 2 and 3 correspond to the first lens LF, and the surface numbers 4 and 5 correspond to the second lens LP. In Numerical Data 5, the surface numbers 6 and 7 correspond to the second lens LP, and the surface numbers 2 and 3 correspond to the first lens LF.

The lens total length is a distance from the observation surface to the image display surface ID. BF is a distance from the lens surface on the image display surface ID side to the image display surface. Moreover, relationships between the above-mentioned Numerical Data and the conditional expressions are shown in Table 1.

(Numerical Data 1)

Unit mm

Surface data

| Surface number | r | d | nd | vd | Effective diameter |
|---|---|---|---|---|---|
| 1 (Stop) | ∞ | (Variable) | | | 3.50 |
| 2 | ∞ | 0.90 | 1.53110 | 56.0 | 48.76 |
| 3*Fre | −74.354 | 0.70 | | | 52.00 |
| 4 | ∞ | 17.00 | 1.53110 | 56.0 | 53.30 |
| 5* | −41.426 | (Variable) | | | 55.34 |
| Image plane | ∞ | | | | |

Aspherical surface data

Third surface

K = 0.00000e+000    A4 = 9.06303e−006    A6 = −3.76059e−009

Fifth surface

K = 0.00000e+000    A4 = 3.88214e−008    A6 = −3.26794e−009

Various data

| Focal length | 52.96 | 52.96 |
|---|---|---|
| F-number | 15.13 | 15.13 |
| Half angle of field (degree) | 55.00 | 45.00 |
| Image height | 49.05 | 41.80 |
| Total lens length | 77.09 | 87.09 |
| BF | 48.49 | 48.49 |
| d1 | 10.00 | 20.00 |
| d5 | 48.49 | 48.49 |
| Entrance pupil position | 0.00 | 0.00 |
| Exit pupil position | −33.14 | −66.65 |
| Front principal point position | 18.60 | 28.60 |
| Rear principal point position | −4.46 | −4.46 |

Zoom lens unit data

| Unit | First surface | Focal length | Lens structure length | Front principal point position | Rear principal point position |
|---|---|---|---|---|---|
| 1 | 1 | ∞ | 0.00 | 0.00 | −0.00 |
| 2 | 2 | 52.96 | 18.60 | 8.60 | −4.46 |

Single lens data

| Lens | First surface | Focal length |
|---|---|---|
| 1 | 1 | 140.00 |
| 2 | 4 | 78.00 |

Length (h0) in the optical axis direction from the surface vertex to the end of the center ring of the Fresnel lens LF: 0.10
Amount of step (h1) of the first ring of the Fresnel lens LF: 0.10

(Numerical Data 2)

Unit mm

Surface data

| Surface number | r | d | nd | vd | Effective diameter |
|---|---|---|---|---|---|
| 1 (Stop) | ∞ | (Variable) | | | 25.00 |
| 2*Fre | 154.136 | 1.10 | 1.53110 | 56.0 | 48.00 |
| 3 | −1,278.956 | 0.50 | | | 48.65 |
| 4 | −843.469 | 0.90 | 1.49200 | 58.0 | 49.11 |
| 5*Fre | −78.386 | 0.70 | | | 50.10 |
| 6 | ∞ | 16.98 | 1.49200 | 58.0 | 51.13 |
| 7* | −41.143 | (Variable) | | | 55.45 |

-continued

Unit mm

Image plane ∞

Aspherical surface data

Fifth surface

K = 0.00000e+000    A4 = 1.06075e-005    A6 = -4.08131e-009

Seventh surface

K = 0.00000e+000    A4 = -3.22682e-007    A6 = -3.26267e-009

Various data

| | | |
|---|---|---|
| Focal length | 49.94 | 49.94 |
| F-number | 2.00 | 2.00 |
| Half angle of field (degree) | 0.00 | 0.00 |
| Image height | 45.40 | 39.16 |
| Total lens length | 74.06 | 84.06 |
| BF | 43.88 | 43.88 |
| d1 | 10.00 | 20.00 |
| d7 | 43.88 | 43.88 |
| Entrance pupil position | 0.00 | 0.00 |
| Exit pupil position | -36.14 | -73.94 |
| Front principal point position | 18.77 | 28.77 |
| Rear principal point position | -6.06 | -6.06 |

Zoom lens unit data

| Unit | First surface | Focal length | Lens structure length | Front principal point position | Rear principal point position |
|---|---|---|---|---|---|
| 1 | 1 | ∞ | 0.00 | 0.00 | -0.00 |
| 2 | 2 | 49.94 | 20.18 | 8.77 | -6.06 |

Single lens data

| Lens | First surface | Focal length |
|---|---|---|
| 1 | 1 | 259.07 |
| 2 | 4 | 175.58 |
| 3 | 6 | 83.62 |

Length (h0) in the optical axis direction from the surface vertex to the end of the center ring of the Fresnel lens LF: 0.20
Amount of step (h1) of the first ring of the Fresnel lens LF: 0.20

(Numerical Data 3)

Unit mm

Surface data

| Surface number | r | d | nd | vd | Effective diameter |
|---|---|---|---|---|---|
| 1 (Stop) | ∞ | (Variable) | | | 3.50 |
| 2 | 100,000.000 | 3.50 | 1.53110 | 56.0 | 48.76 |
| 3*Fre | -80.546 | 0.70 | | | 52.00 |
| 4* | 237.548 | 15.00 | 1.53110 | 56.0 | 53.30 |
| 5* | -36.019 | (Variable) | | | 55.34 |
| Image plane | ∞ | | | | |

Aspherical surface data

Third surface

K = 0.00000e+000    A4 = -1.35561e-005    A6 = 2.66207e-008
A8 = -1.06533e-011

Fourth surface

K = 0.00000e+000    A4 = -2.18599e-005    A6 = 4.07744e-008
A8 = -2.04247e-011    A10 = 1.57785e-015

Fifth surface

K = 0.00000e+000    A4 = 2.20301e-006    A6 = -7.68945e-009
A8 = 1.19113e-011

Various data

| | | |
|---|---|---|
| Focal length | 44.99 | 44.99 |
| F-number | 12.85 | 12.85 |
| Half angle of field (degree) | 55.00 | 45.00 |
| Image height | 43.00 | 36.35 |
| Total lens length | 70.09 | 70.09 |
| BF | 40.89 | 40.89 |
| d1 | 10.00 | 20.00 |
| d5 | 40.89 | 40.89 |
| Entrance pupil position | 0.00 | 0.00 |
| Exit pupil position | -37.93 | -88.19 |
| Front principal point position | 19.31 | 29.31 |
| Rear principal point position | -4.10 | -4.10 |

Zoom lens unit data

| Unit | First surface | Focal length | Lens structure length | Front principal point position | Rear principal point position |
|---|---|---|---|---|---|
| 1 | 1 | ∞ | 0.00 | 0.00 | -0.00 |
| 2 | 2 | 44.99 | 19.20 | 9.31 | -4.10 |

Single lens data

| Lens | First surface | Focal length |
|---|---|---|
| 1 | 1 | 151.54 |
| 2 | 4 | 60.03 |

Length (h0) in the optical axis direction from the surface vertex to the end of the center ring of the Fresnel lens LF: 2.40
Amount of step (h1) of the first ring of the Fresnel lens LF: 0.08

(Numerical Data 4)

Unit mm

Surface data

| Surface number | r | d | nd | vd | Effective diameter |
|---|---|---|---|---|---|
| 1 (Stop) | ∞ | (Variable) | | | 3.50 |
| 2* | ∞ | 1.20 | 1.53110 | 56.0 | 47.52 |
| 3*Fre | -60.784 | 1.00 | | | 48.02 |
| 4* | 713.403 | 11.00 | 1.53110 | 56.0 | 49.31 |
| 5* | -40.000 | 0.50 | | | 51.42 |
| 6* | -86.712 | 3.20 | 1.63400 | 23.9 | 54.01 |
| 7 | -350.000 | (Variable) | | | 58.34 |
| Image plane | ∞ | | | | |

Aspherical surface data

Second surface

K = 0.00000e+000    A4 = 1.89729e-006    A6 = -8.84019e-010
A8 = -1.25103e-012    A10 = 1.57785e-015

Third surface

K = 0.00000e+000    A4 = 3.97631e-006    A6 = -3.55111e-009
A8 = 4.66493e-012    A10 = -2.03020e-015

Fourth surface

K = 0.00000e+000    A4 = -5.11143e-006    A6 = 7.48504e-009
A8 = -2.37822e-012

-continued

Unit mm

Fifth surface

K = 0.00000e+000    A4 = 1.77056e−006    A6 = −3.94962e−009
A8 = 6.60438e−012

Sixth surface

K = 0.00000e+000    A4 = 3.58978e−007    A6 = −1.47504e−009
A8 = 1.50893e−012

Various data

| | | |
|---|---|---|
| Focal length | 60.00 | 60.00 |
| F-number | 17.14 | 17.14 |
| Half angle of field (degree) | 50.00 | 42.00 |
| Image height | 54.18 | 45.93 |
| Total lens length | 79.87 | 89.87 |
| BF | 52.97 | 52.97 |
| d1 | 10.00 | 20.00 |
| d7 | 52.97 | 52.97 |
| Entrance pupil position | 0.00 | 0.00 |
| Exit pupil position | −26.51 | −49.02 |
| Front principal point position | 14.70 | 24.70 |
| Rear principal point position | −7.03 | −7.03 |

Zoom lens unit data

| Unit | First surface | Focal length | Lens structure length | Front principal point position | Rear principal point position |
|---|---|---|---|---|---|
| 1 | 1 | ∞ | 0.00 | 0.00 | −0.00 |
| 2 | 2 | 60.00 | 16.90 | 4.70 | −7.03 |

Single lens data

| Lens | First surface | Focal length |
|---|---|---|
| 1 | 1 | 114.38 |
| 2 | 4 | 71.68 |
| 3 | 6 | −182.67 |

Length (h0) in the optical axis direction from the surface vertex to the end of the center ring of the Fresnel lens LF: 0.10
Amount of step (h1) of the first ring of the Fresnel lens LF: 0.10

(Numerical Data 5)

Unit mm

Surface data

| Surface number | r | d | nd | vd | Effective diameter |
|---|---|---|---|---|---|
| 1 (Stop) | ∞ | (Variable) | | | 3.50 |
| 2 | −5,943.465 | 0.96 | 1.53110 | 56.0 | 50.92 |
| 3*Fre | −81.454 | 0.50 | | | 51.91 |
| 4*Fre | −150.546 | 1.50 | 1.64000 | 23.5 | 52.49 |
| 5 | −499.468 | 0.50 | | | 53.03 |
| 6 | −519.519 | 12.18 | 1.53110 | 56.0 | 53.60 |
| 7* | −37.297 | (Variable) | | | 56.23 |
| Image plane | ∞ | | | | |

-continued

Unit mm

Aspherical surface data

Fourth surface

K = 0.00000e+000    A4 = 2.17893e−006    A6 = −2.20791e−010

Seventh surface

K = 0.00000e+000    A4 = 2.92372e−006    A6 = 4.58045e−009
A8 = −1.33480e−012

Various data

| | | |
|---|---|---|
| Focal length | 61.29 | 61.29 |
| F-number | 17.51 | 17.51 |
| Half angle of field (degree) | 53.00 | 42.00 |
| Image height | 59.88 | 47.78 |
| Total lens length | 85.31 | 95.31 |
| BF | 59.67 | 59.67 |
| d1 | 10.00 | 20.00 |
| d7 | 59.67 | 59.67 |
| Entrance pupil position | 0.00 | 0.00 |
| Exit pupil position | −29.42 | −57.12 |
| Front principal point position | 19.12 | 29.12 |
| Rear principal point position | −1.62 | −1.62 |

Zoom lens unit data

| Unit | First surface | Focal length | Lens structure length | Front principal point position | Rear principal point position |
|---|---|---|---|---|---|
| 1 | 1 | ∞ | 0.00 | 0.00 | −0.00 |
| 2 | 2 | 61.29 | 15.64 | 9.12 | −1.62 |

Single lens data

| Lens | First surface | Focal length |
|---|---|---|
| 1 | 1 | 155.49 |
| 2 | 4 | −337.29 |
| 3 | 6 | 75.00 |

Length (h0) in the optical axis direction from the surface vertex to the end of the center ring of the Fresnel lens LF: 0.06

Amount of step (h1) of the first ring of the Fresnel lens LF: 0.06

[Table 1]

TABLE 1

| Example | Conditional Expression (1) | Conditional Expression (2) | Conditional Expression (3) | Conditional Expression (4) |
|---|---|---|---|---|
| 1 | 1.795 | 0.017 | 170.195 | −1.000 |
| 2 | 2.100 | 0.050 | 340.391 | −1.205 |
| 3 | 2.524 | 0.078 | 136.156 | −0.998 |
| 4 | 1.596 | 0.020 | 170.195 | −0.999 |
| 5 | 2.073 | 0.016 | 102.117 | −1.028 |

| Example | Conditional Expression (5) | Conditional Expression (6) | Conditional Expression (7) | Conditional Expression (8) |
|---|---|---|---|---|
| 1 | −1.000 | 0.351 | 0.638 | −0.226 |
| 2 | −1.000 | 0.372 | 0.613 | −0.238 |
| 3 | −0.737 | 0.427 | 0.613 | −0.212 |
| 4 | −0.894 | 0.220 | 0.679 | −0.188 |
| 5 | −1.155 | 0.255 | 0.697 | −0.181 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-024739, filed on Feb. 14, 2017, which is hereby incorporated by reference herein in its entirety.

What is claimed is:

1. An observation optical system used for observing an image displayed on an image display surface, the observation optical system comprising, in order from an observation surface side to the image display surface side:
a first lens having a positive refractive power; and
a second lens having a positive refractive power and disposed on the image display surface side of the first lens,
wherein the first lens is a Fresnel lens, and
wherein the following conditional expression is satisfied:

$1.50 < f1/f2 < 2.75$; and $0.01 < L/f < 0.080$, where f1 is a focal length of the first lens, f2 is a focal length of the second lens, f is a focal length of the observation optical system, and L is a distance from a lens surface on the observation surface side of a lens that is located closest to the observation surface side to a lens surface on the image display surface side of the first lens.

2. An observation optical system according to claim 1, wherein the first lens has a surface on the image display surface side that is a Fresnel surface.

3. An observation optical system according to claim 1, wherein the first lens has a surface on the observation surface side that has a continuous shape in a ray effective area.

4. An observation optical system according to claim 1, wherein the following conditional expression is satisfied:

$50.0 < h1/\lambda d < 500.0$, where h1 is a length in an optical axis direction of a grating wall surface of a first ring adjacent to a center ring of a Fresnel surface of the first lens, and $\lambda d$ is a length of a wavelength of a d-line.

5. An observation optical system according to claim 1, wherein the following conditional expression is satisfied:

$-1.5 < (R12+R11)/(R12-R11) < -0.8$, where R11 is a curvature radius of a surface on the observation surface side of the first lens, and R12 is a curvature radius of a surface on the image display surface side of the first lens.

6. An observation optical system according to claim 1, wherein the following conditional expression is satisfied:

$-1.5 < (R22+R21)/(R22-R21) < -0.6$, where R21 is a curvature radius of a surface on the observation surface side of the second lens, and R22 is a curvature radius of a surface on the image display surface side of the second lens.

7. An observation optical system according to claim 1, wherein the following conditional expression is satisfied:

$0.20 < d/f < 0.45$, where d is a distance from a surface on the observation surface side of the first lens to a surface on the image display surface side of the second lens.

8. An observation apparatus, comprising:
an image display element, which is configured to display image information; and
an observation optical system used for observing an image displayed on an image display surface of the image display element,
wherein the observation optical system includes, in order from an observation surface side to the image display surface side:
a first lens having a positive refractive power; and
a second lens having a positive refractive power and disposed on the image display surface side of the first lens,
wherein the first lens is a Fresnel lens, and
wherein the following conditional expression is satisfied:

$1.50 < f1/f2 < 2.75$; and $0.01 < L/f < 0.080$, where f1 is a focal length of the first lens, f2 is a focal length of the second lens, f is a focal length of the observation optical system, and L is a distance from a lens surface on the observation surface side of a lens that is located closest to the observation surface side to a lens surface on the image display surface side of the first lens.

9. An observation apparatus according to claim 8, wherein the following conditional expression is satisfied:

$0.5 < y/Lall < 0.8$, where y is an actual image height of the image display surface at an eye relief of 10 mm and a half angle of view of 45°, and Lall is a distance from the observation surface to the image display surface at the eye relief of 10 mm.

10. An observation apparatus according to claim 8, wherein the following conditional expression is satisfied:

$-0.30 < (y-y0)/y0 < -0.15$, where y0 is an ideal image height of the image display surface at an eye relief of 10 mm and a half angle of view of 45°, and y is an actual image height of the image display surface at the eye relief of 10 mm and the half angle of view of 45°.

11. An observation optical system according to claim 1, wherein the following conditional expression is satisfied:

$50.0 < h1/\lambda d < 400.0$, where h1 is a length in an optical axis direction of a grating wall surface of a first ring adjacent to a center ring of a Fresnel surface of the first lens, and $\lambda d$ is a length of a wavelength of a d-line.

12. An observation apparatus according to claim 8, wherein the following conditional expression is satisfied:

$-0.25 < (y-y0)/y0 < -0.15$, where y0 is an ideal image height of the image display surface at an eye relief of 10 mm and a half angle of view of 45°, and y is an actual image height of the image display surface at the eye relief of 10 mm and the half angle of view of 45°.

13. An observation apparatus, comprising:
an image display element, which is configured to display image information; and
an observation optical system used for observing an image displayed on an image display surface of the image display element,
wherein the observation optical system includes, in order from an observation surface side to the image display surface side:
a first lens having a positive refractive power; and
a second lens having a positive refractive power, wherein the first lens is a Fresnel lens, and
wherein the following conditional expression is satisfied:

$1.50 < f1/f2 < 2.75$; and $-0.30 < (y-y0)/y0 < -0.15$, where f1 is a focal length of the first lens, f2 is a focal length of the second lens, y0 is an ideal image height of the image display surface at an eye relief of 10 mm and a half angle of view of 45°, and y is an actual image height of the image display surface at the eye relief of 10 mm and the half angle of view of 45°.

14. An observation apparatus according to claim 13, wherein the following conditional expression is satisfied:

$-0.25 < (y-y0)/y0 < -0.15$.

* * * * *